May 17, 1960   J. HEZLER, JR., ET AL   2,937,047
CONCEALED DRIP GUTTER AND PASSENGER COMPARTMENT
VENTILATION MEANS FOR AUTOMOTIVE VEHICLE
Filed Feb. 28, 1958   2 Sheets-Sheet 1

INVENTORS
Julius Hezler, Jr. &
BY Joseph R. Schemansky

ATTORNEY

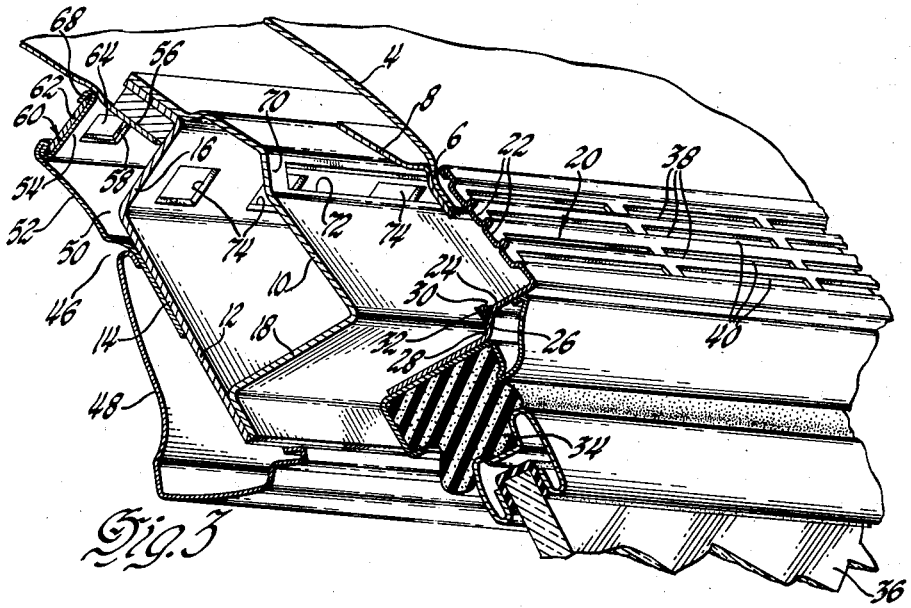
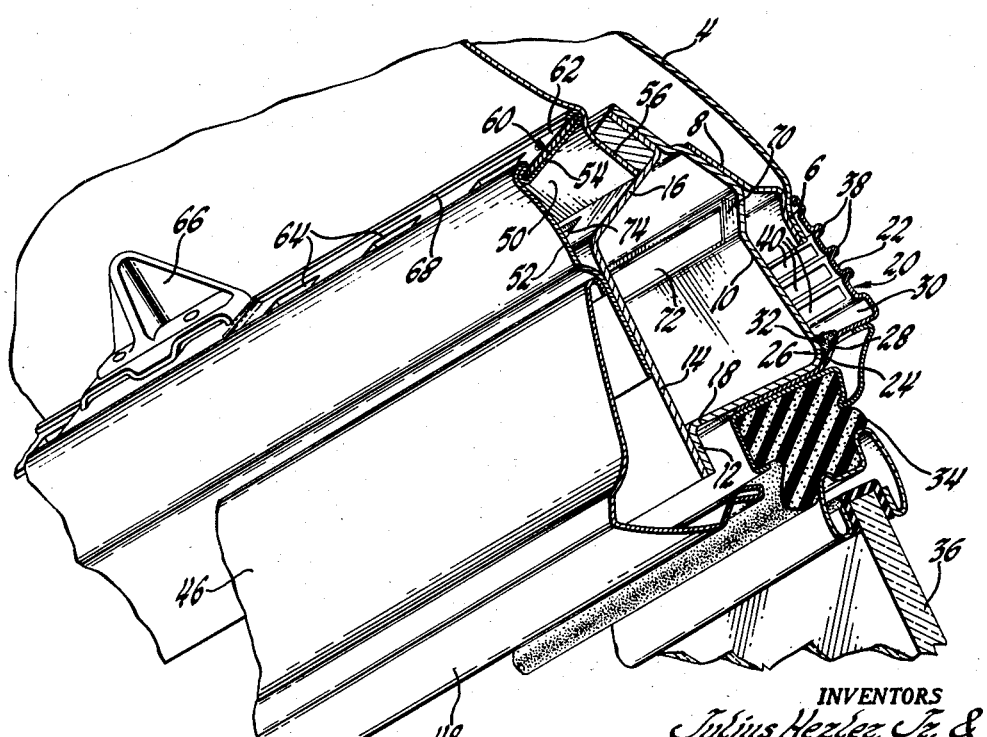

United States Patent Office 2,937,047
Patented May 17, 1960

2,937,047

CONCEALED DRIP GUTTER AND PASSENGER COMPARTMENT VENTILATION MEANS FOR AUTOMOTIVE VEHICLE

Julius Hezler, Jr., East Detroit, and Joseph R. Schemansky, Birmingham, Mich., assignors to General Motors Corporation, Detroit, Mich., a corporation of Delaware Application February 28, 1958, Serial No. 718,192

9 Claims. (Cl. 296—28)

This invention relates generally to automotive bodies and more particularly to means for venting the passenger compartments of such bodies wherein the same means is utilized to collect and carry off water on the roofs of such bodies.

For many years automotive vehicles have utilized a conventional U-shaped gutter which protrudes rather extensively outwardly of the vehicle. The gutter's main function has been to collect rain and other water that falls on the roof and carry it off to the rear of the vehicle to avoid such water dripping on the car occupants as they enter and leave the vehicle and to prevent such water from splashing the side windows and sides of the vehicle. The purpose of the present invention is to obviate the need for such a gutter by providing novel means for carrying the water off interior of the vehicle while at the same time the novel means for doing so is ventilating the passenger compartment of the vehicle. This has been accomplished by the provision of aesthetic appearing fluted strips longitudinally extending on either side of the vehicle coextensive with the roof line at its lower edge and which have a plurality of perforations immediately above the flutes of the strips. The flutes and the holes direct any water rolling along the roof toward the lower edge thereof inside the fluted strips to gutters which are uniquely formed with the strips and the roof side rails to which the lower edges of the roof are normally attached. The perforations in the fluted strips in combination with added holes in the roof rails leading to plenum chambers also provided with openings whose sizes may be varied by movable closure means located within the passenger compartment allow regulated ventilation of the passenger compartment.

From the foregoing, it will appear that it is a primary object of this invention to replace the conventional U-shaped gutters presently extensively used on automotive vehicles, with novel means which substantially improve the aesthetic appearance of the vehicle and ventilate the passenger compartment of the vehicle.

For a full understanding of this invention and the above and other objects thereof, reference may be made to the accompanying detailed description and the drawings in which:

Figure 3 is a view similar to Figure 2 except that it is a perspective view from exteriorly of the vehicle.

Figure 4 is like Figures 2 and 3 except that it illustrates a perspective of the section viewed from the passenger compartment of the vehicle.

Since both sides of the vehicle are similar, the description will be limited to only one side thereof.

Figure 1:
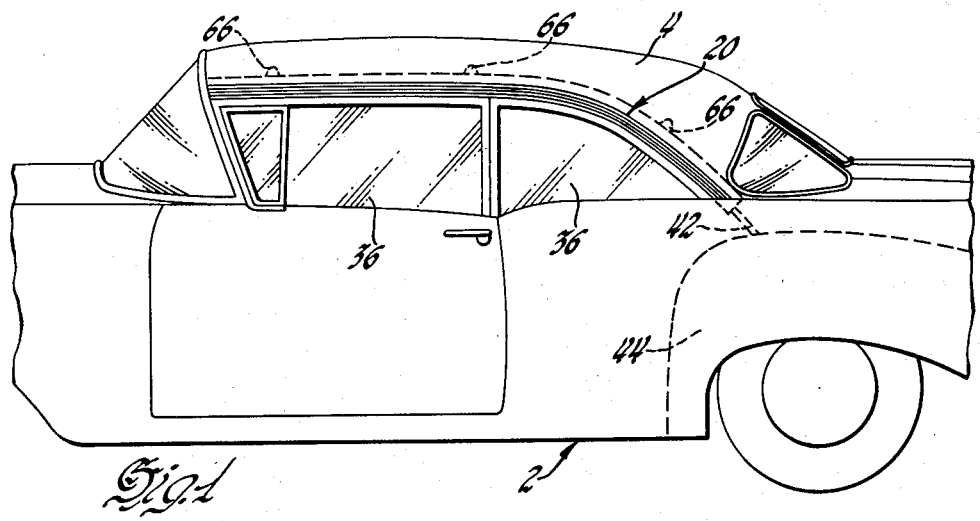
Figure 1 is a side view in elevation of a portion of a vehicle showing the invention applied thereto and indicating how the water, after being collected interiorly of the drip panel, is carried off inwardly thereof to a rear wheel housing.
Figure 2:
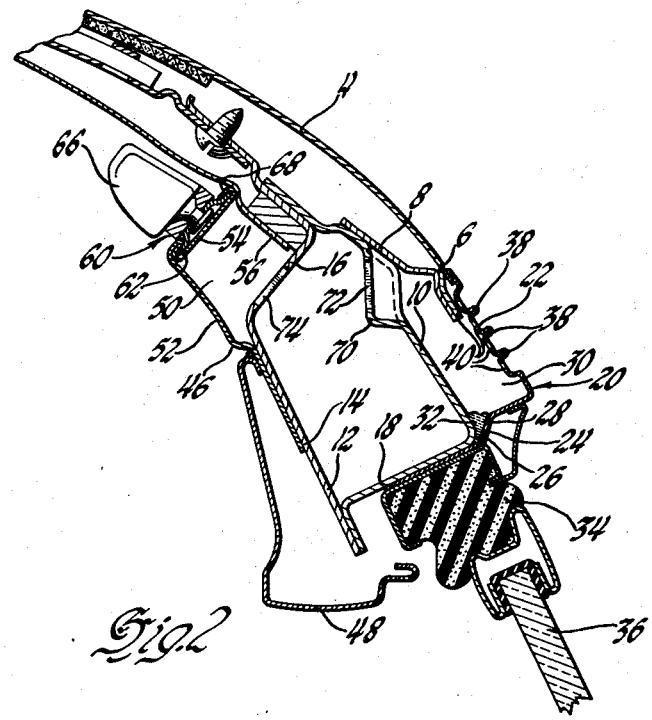
Figure 2 is an enlarged fragmentary view of parts broken away and in section of a typical section at the lower roof edge illustrating the details of construction of the roof side rail and the novel drip panel applied thereto as well as the novel means for ventilating the passenger compartment of the vehicle.

Referring now to the drawings, a vehicle body is indicated generally by a numeral 2. The body includes the usual roof panel 4 whose lower edge 6 is reinforced by a small plate 8 and secured to the outward side 10 of a roof rail 12 which is box-like in cross section. The roof rail 12, in addition to being provided with an outward side 10, is also provided with an inward side 14 and upper and lower sides 16 and 18, respectively. Coextensive with the roof panel 4 at its lower edge 6 is a novel drip panel indicated generally by a numeral 20. The drip panel 20 is in the form of an elongated strip adapted to follow the vehicle contour as indicated in Figure 1 and is provided with a more or less upstanding leg 22 and a more or less horizontal leg 24 which extends inwardly relative to the vehicle body 2. The free edge of leg 24 of panel 20 is secured to the lower side 18 of the roof rail 12. At the initial junction 26 of leg 24 with lower side 18, due to the offset portion 28, there is formed a gutter 30 which is suitably sealed against leakage by the sealing material 32. Located below the leg 24 along the lower side 18 of roof panel 12 is the usual roof panel weather strip assembly 34 into which the window or windows 36 of the vehicle may be raised.

Returning now to the upstanding leg 22 of the drip panel 20, it will be observed that this leg 22 is provided with a plurality of laterally extending vertically spaced flutes 38 provided with a plurality of longitudinally spaced perforations 40 located immediately thereabove. The flutes 38 serve to direct the water which is shed by the roof through the perforations or openings 40 into the gutter 30. The water collected in gutter 30 may then be carried inwardly of the leg 22 of the panel 20 along the length thereof due to a slight slope toward the rear of the vehicle where it may be drained to the ground through the tubular member 42 leading from the rearward end of gutter 30 to the wheel housing 44.

From the foregoing description, it may be appreciated that the usual relatively large U-shaped gutter normally appearing on most automotive vehicles today has been eliminated and a unique aesthetic appearing drip panel has been substituted in its place which maintains the general contour of the roof by being coextensive therewith and which in combination with the conventional roof rail forms an interior gutter which carries off the water to a rear wheel housing thereby preventing it from blowing about on the rearward exterior portions of the vehicle and any other vehicles in close proximity to the rear thereof.

The perforations 40 may also be utilized in a unique manner to ventilate the vehicle passenger compartment which is indicated by a numeral 46. In the passenger compartment 46 is located the usual trim molding 48 secured to the inward side 14 of the roof rail 12. Along the upper side 16 of the roof rail 12 a plenum chamber 50 is formed and has inward, upward, and outward sides 52, 54, and 56 respectively. The upward side 54 is provided with rectangularly shaped perforations or openings 58. Adjacent to the upward side 54 of plenum chamber 50 is a sliding closure means indicated generally by a numeral 60. The sliding closure means comprises a plate 62 which is also provided with rectangularly shaped openings 64 which may be aligned with those in the upper side 54 of a plenum chamber 50. Sliding movement accomplished by the handle 66 of plates 62 may operate to close off the openings 58 or to open them to any desired degree in view of the spacing 68 provided between the apertures 64 and similar spacing provided between the apertures 58. In order for air passing through the openings 40 and the drip panel 20 to enter into the plenum chamber 50, the outward side wall 10 of roof rail 12 is provided with indentations or offsets 70 in which there are holes or openings 72. The upper side 16 of roof rail 12 is also provided with a series of longitudinally spaced openings 74. Thus the air may enter the openings 40, flow through the openings 72 and 74 into the plenum chamber 50, from whence its entry into the passenger compartment 46 may be regulated by the sliding closure means 60 as indicated. One or more of such sliding closure means can be provided to localize the entry of the ventilating air to specific parts of the passenger compartment. This is evidenced by the fact that three such sliding closures are indicated by the numeral 66 in Figure 1.

It may now be appreciated that in addition to enhancing the appearance of the vehicle and improving the manner of carrying off water which is being shed from the roof of the vehicle, the same means are combined in an unusual manner with the roof rails of the vehicle and sliding closure means to vent the passenger compartment of the vehicle.

We claim:

1. In a body frame structure for an automotive vehicle, a roof rail, a roof panel secured to said rail and having a lower edge spaced from and overhanging the outboard side of said rail, a perforated drip molding panel coextensive with the lower edge of said roof panel and forming therewith and with the outboard side of said rail an inner gutter for carrying off water inwardly of said panel collected from said roof through the perforations in said drip molding panel.

2. The invention defined in claim 1 wherein said drip molding panel includes a plurality of vertically spaced outwardly extending ribs each having located immediately thereabove at least one of said perforations.

3. The invention defined in claim 1 wherein said drip molding panel includes at least one outwardly extending rib having at least one of said perforations located immediately thereabove.

4. In a body frame structure for an automotive vehicle, a roof panel having at least one downwardly extended side and an inward channel assembly defining the lower edge of the roof at said one side of the vehicle, said channel assembly being at least partially open upwardly into the passenger compartment of the vehicle, said channel assembly having perforations therealong in the outward side thereof whereby said assembly is adapted to receive roof run-off water and vent said passenger compartment, and means for draining said channel assembly of water received therein.

5. In a body frame structure for an automotive vehicle, a roof panel having at least one downwardly extended side and an inward channel assembly defining the lower edge of the roof at said one side of the vehicle, said channel assembly being at least partially open upwardly into the passenger compartment of the vehicle, said channel assembly having perforations therealong in the outward side thereof for entry of roof run-off water and passage of air to vent said passenger compartment, means for draining said channel assembly of water, and movable closure means mounted on said channel assembly for regulating the flow of ventilating air between said assembly and the passenger compartment.

6. The invention defined in claim 4 wherein the outward side of said channel assembly includes at least one outwardly extending rib having at least one of said perforations located immediately thereabove.

7. The invention defined in claim 4 wherein the outward side of said channel assembly includes a plurality of vertically spaced outwardly extending ribs each having located immediately thereabove at least one of said perforations.

8. In a body frame structure for an automotive vehicle, a roof rail of box section, a roof panel secured to said rail adjacent a lower edge of said panel, said lower edge being spaced from and overhanging said rail outwardly thereof, a drip molding coextensive with said edge forming with the outward side of said rail a gutter, said molding having apertures therein allowing water to be collected from said roof panel into said gutter, means for draining water from said gutter, and a plenum chamber mounted on said rail having openings therein adapted to communicate with the passenger compartment of the vehicle, the walls of said rail having openings therein connecting said gutter with said plenum chamber to vent the passenger compartment.

9. The invention defined in claim 8 which further includes movable closure means mounted over some of the openings in said plenum chamber for regulating the venting of the passenger compartment.

References Cited in the file of this patent

FOREIGN PATENTS 342,217    Germany  ---------------  Feb. 14, 1918